(12) United States Patent
Sheikh et al.

(10) Patent No.: US 9,225,521 B2
(45) Date of Patent: Dec. 29, 2015

(54) APPARATUS AND METHOD FOR SKEIN HASHING

(71) Applicant: Intel Corporation, Santa Clara, CA (US)

(72) Inventors: Farhana Sheikh, Portland, OR (US); Jesse Walker, Hillsboro, OR (US); Sanu K. Mathew, Hillsboro, OR (US); Ram K. Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/507,427

(22) Filed: Oct. 6, 2014

(65) Prior Publication Data

US 2015/0023500 A1    Jan. 22, 2015

Related U.S. Application Data

(63) Continuation of application No. 13/165,269, filed on Jun. 21, 2011, now Pat. No. 8,855,302.

(51) Int. Cl.
| | |
|---|---|
| *H04L 9/00* | (2006.01) |
| *H04L 9/08* | (2006.01) |
| *H04L 9/06* | (2006.01) |
| *H04N 1/32* | (2006.01) |

(52) U.S. Cl.
CPC ............ *H04L 9/0861* (2013.01); *H04L 9/0618* (2013.01); *H04L 9/0625* (2013.01); *H04L 9/0637* (2013.01); *H04L 9/0643* (2013.01); *H04L 9/0816* (2013.01); *H04L 9/0631* (2013.01); *H04L 2209/125* (2013.01); *H04L 2209/24* (2013.01); *H04N 1/32277* (2013.01)

(58) Field of Classification Search
CPC ... H04L 9/0618; H04L 9/0625; H04L 9/0631; H04N 1/32277
USPC ........................................................... 380/44
See application file for complete search history.

(56) References Cited

U.S. PATENT DOCUMENTS

| | | | |
|---|---|---|---|
| 7,242,766 B1 * | 7/2007 | Lyle | 380/2 |
| 2010/0303229 A1 * | 12/2010 | Unruh | 380/28 |

OTHER PUBLICATIONS

Niels Ferguson, The Skein Hash Function Family, Oct. 2010, Microsoft Corp., Version 1.3.*
Wang, Xiaoyun, et al., "Finding Collisions in the Full SHA-1", Crypto 2006, pp. 19-36.
Ferguson. "The Skein Hash Function Family", Nov. 15, 2008, Version 1.1.
Ferguson, Neils, "The Skein Hash Function Family", Oct. 2009, Microsoft Corp., Version 1.2.

* cited by examiner

*Primary Examiner* — Arvin Eskandarnia
(74) *Attorney, Agent, or Firm* — Blakely, Sokoloff, Taylor & Zafman LLP

(57) ABSTRACT

Described herein are an apparatus and method for Skein hashing. The apparatus comprises a block cipher operable to receive an input data and to generate a hashed output data by applying Unique Block Iteration (UBI) modes, the block cipher comprising at least two mix and permute logic units which are pipelined by registers; and a counter, coupled to the block cipher, to determine a sequence of the UBI modes and to cause the block cipher to process at least two input data simultaneously for generating the hashed output data.

18 Claims, 17 Drawing Sheets

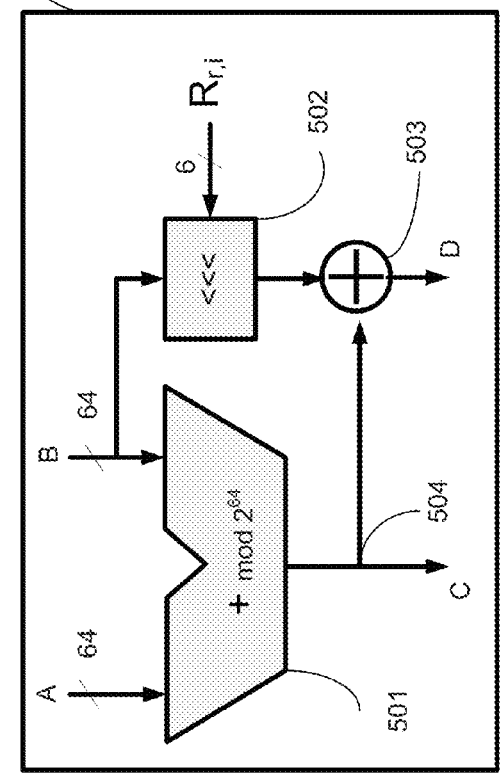
Fig. 5A
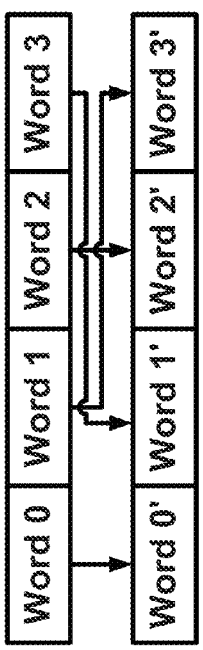
Fig. 5B  Threefish-256 permute
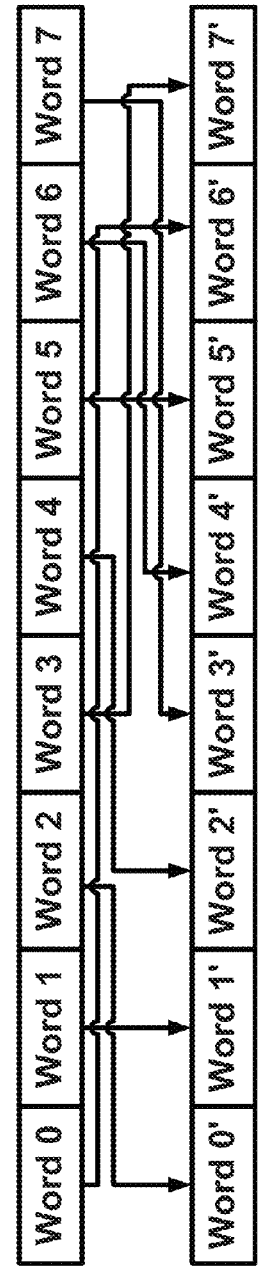
Fig. 5C  Threefish-512 permute

APPARATUS AND METHOD FOR SKEIN HASHING

The present application is a continuation of U.S. patent application Ser. No. 13/165,269, filed on Jun. 21, 2011, entitled "APPARATUS AND METHOD FOR SKEIN HASHING", which is hereby incorporated by reference in their entirety.

FIELD OF THE INVENTION

Embodiments of the invention relate generally to the field of hashing a string of characters. More particularly, embodiments of the invention relate to an apparatus and method of an efficient hardware implementation of Skein hash functions.

BACKGROUND

Hashing is the transformation of a string of characters into a usually shorter fixed-length value or key that represents the original string of characters. Hashing is used to index and retrieve items in a database because it is faster to locate the items from the database by means of the shorter length of the hash key than by using the original string to locate the item in the database. The above process of retrieving items by means of the shorter length hashed key is referred to herein as the "hash function."

Hashing is also used to encrypt and decrypt digital signatures which are used to authenticate message senders and receivers. The digital signature is transformed by means of the hash function into a hashed value, also referred to as "message digest." The digital signature and the message digest are then transmitted from the sender to a receiver. The receiver then derives the message digest from the transmitted digital signature by applying the same hash function as that applied by the sender. The receiver then compares the derived message digest and the message digest transmitted by the sender to the receiver. If there is no alteration in the digital signal during transmission or in the message digest during transmission, the comparison operation at the receiver should result in the same message digest as the one transmitted from the sender to the receiver.

Skein is a family of hash functions based on a tweakable block cipher. The term "block cipher" herein refers to applying an encryption algorithm on blocks of data message to generate encrypted data. The term "tweakable" herein refers to the ability to randomize the output (i.e., encrypted data) of the block cipher. One such tweakable block cipher is called "Threefish." The process or rule of computing the hashed output from the Threefish is referred as the "mode." One known mode is the Unique Block Iteration (UBI) mode.

In 2005 X. Wang and her colleagues (Xiaoyun Wang, Yiqun Lisa Yin, and Hongbo Yu, "Finding Collisions in the Full SHA-1", Crypto 2006, pp 19-36.) discovered that the standard hash algorithm SHA-1 admitted collisions at a cost of $2^{62}$ SHA-1 operations instead of the expected value of $2^{80}$. This result made a profound impression on the international cryptographic community, with the conclusion that SHA-1 was no longer usable for many of its basic functions. Due to the structural similarities between SHA-1 and the SHA-2 family, the integrity of the latter was immediately called into question. In response, the U.S. National Institute of Science and Technology (NIST) instituted an international competition to design a new cryptographic hashing algorithm to replace SHA-1 and SHA-2.

Previous hardware based implementations of UBI based Threefish block cipher Skein algorithm in a software platform on a general purpose microprocessor resulted in poor performance. The term "performance" herein refers to power consumption, silicon area, and processor clock cycles per byte to compute the hashed output. Even hardware based implementations of the UBI based Threefish Skein algorithm using standard cells and Field-programmable Gate Arrays (FPGAs) in a 0.18 μm CMOS process technology resulted in poor performance e.g., 1.88 Gbit/s throughput to compute a hashed output for Skein-256 hardware implementation operating a clock frequency of 73.52 MHz. A poor performing hardware implementation of UBI based Threefish block cipher Skein algorithm is an impediment to large scale secure commercial transactions that require secure digital finger prints i.e., hashed output.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

FIG. 5A is a hardware implementation of a mix logic unit as used in the block cipher, according to one embodiment of the invention.

FIG. 5B is a hardware implementation of a permute logic unit for 256 bit word, according to one embodiment of the invention.

FIG. 5C is a hardware implementation of a permute logic unit for 512 bit word, according to one embodiment of the invention.

DETAILED DESCRIPTION

Embodiments of the invention relate to an apparatus and method of an efficient hardware implementation of Skein hash functions. While the hardware implementation is described with reference to a 512 bit Unique Block Identification (UBI) mode, the concept of the hardware implementation can be used for other UBI modes e.g., 256 bit UBI mode, 1024 bit UBI mode, etc.

In the following description, numerous details are discussed to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Figure 1:
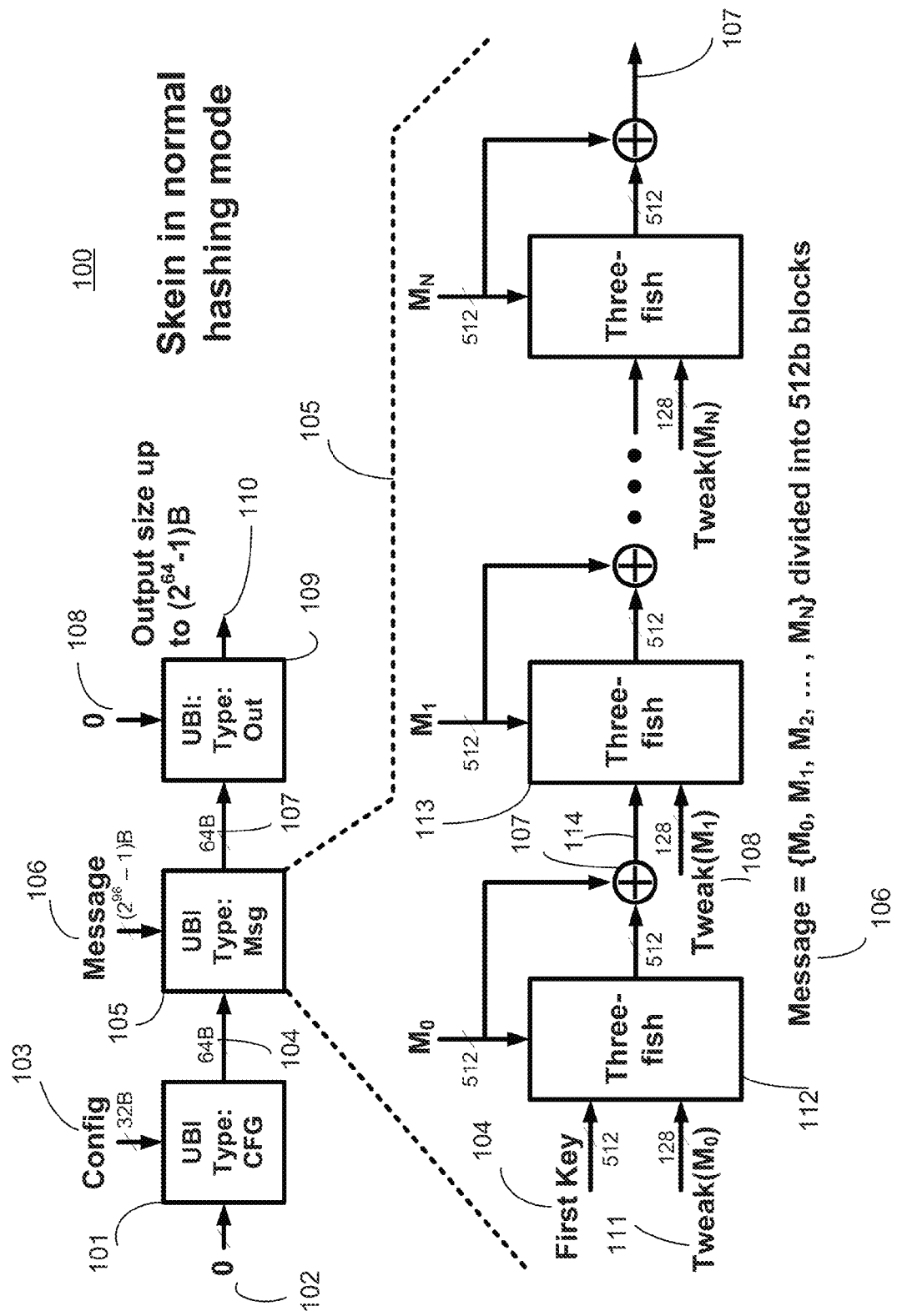
FIG. 1 is a logical level view of Skein hashing function algorithm using Unique Block Identification (UBI).

FIG. 1 is a logical level view 100 of Skein hashing function algorithm using UBI modes for 512 bit data (message) blocks. A person skilled in the art would know the Skein hashing function algorithm, so only a brief overview is provided herein to facilitate the description of the hardware embodiments of the Skein hashing algorithm.

Figure 2:
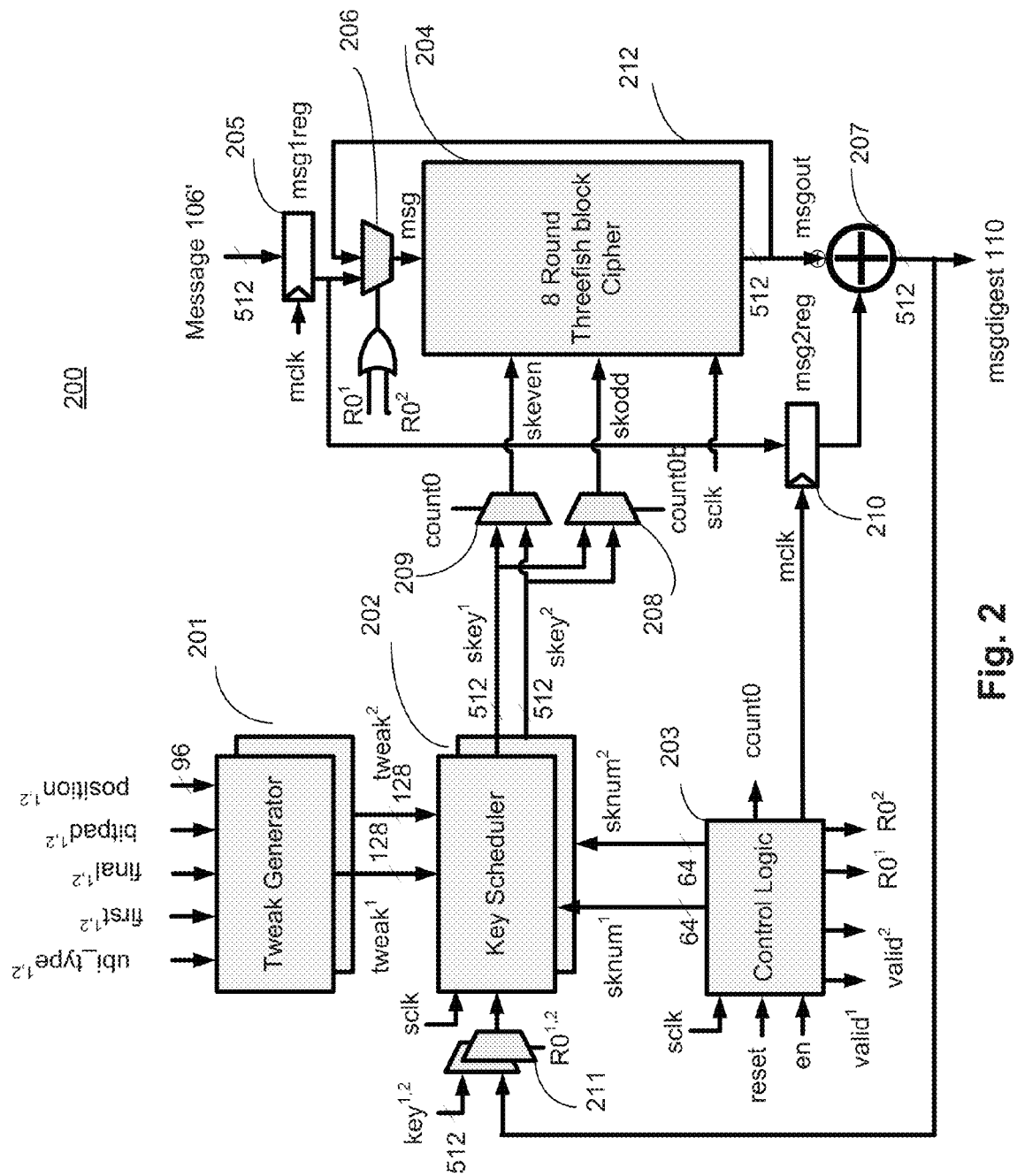
FIG. 2 is a high level hardware implementation of the Skein hashing function algorithm, according to one embodiment of the invention.

The Skein hashing function algorithm, which is implemented in hardware as shown by the embodiment of FIG. 2, comprises three UBI mode calls. The three UBI mode calls are used to chain a series of block ciphers to support the Skein algorithm. The first call 101 is a configuration call which is identified by the configuration data 103. The configuration data 103 is a 32-byte configuration string that encodes the desired output length and parameters for tree hashing. In one embodiment, for Skein in standard hash mode, the output size is fixed and no tree hashing is required. In such an embodiment, the configuration data 103 is constant for all messages and can be precomputed as an initialization vector, IV. The first call 101 applies an initialization vector '0' 102 to generate the first key 104. The second call 105 receives a first key 104 and a tweak data 111 and uses that information to convert the to-be hashed message 106 into the hash output 107. The third call 109 converts the hash output 107 to a new hashed output 110 which is indistinguishable from random data. The third call 109 also receives any integer number (0, 1, 2, 3, . . . ) 108 to randomize the hashed output 107.

A logical operation of the second UBI mode call 105 is illustrated in the expanded view of the second call 105. In the Skein hashing function algorithm, the message data 106 is chopped into equal sized blocks and each block is input to a corresponding block cipher (e.g., Threefish 106). For the sake of brevity, only block ciphers 112 and 113 are discussed. The block cipher 112 generates a message digest (hashed output) by using the key 104 and the tweak 111. The hashed output is then exclusive-ORed 107 with the corresponding portion of message data to generate hashed output 114. The hashed output 114 is then used as a key for the next block cipher 113 which also receives a new tweak data 108 to generate a new hashed output. This process is repeated as a chain until all message blocks are exhausted to generate the hash output 107. The hash output 107 is then randomized to generate the final hash output 110.

FIG. 2 is a high level hardware implementation 200 of the Skien-512 hashing function algorithm, according to one embodiment of the invention. In one embodiment, the Skein-512 hardware comprises a tweak generator 201 coupled to a key scheduler 202, a pipelined unrolled block cipher (Threefish) to generate a message digest 110, and a control logic 203 to generate control signals for generating the message digest 110. In one embodiment, the tweak generator 201 comprises two tweak generators that generate tweak1 and tweak2 signals. In one embodiment, the key scheduler 202 comprises two key schedulers, each key scheduler to receive a corresponding tweak1 and tweak2 signal. The inputs to the tweak generator 201 are shown with reference to FIG. 7.

Referring back to FIG. 2, in one embodiment the message 106 is $(2^{96}-1)$ bytes long and is parsed/chopped into equal sized blocks of messages of length 512 bits which are input to the block cipher 204. In one embodiment, if the message 106 is not a multiple of 512 b, then the last block of message is padded with zeros so that its length is 512 bits. In the embodiments discussed herein, each block of message is represented as message 106' which is 512 bits long.

In one embodiment, the data path of the block cipher 204 comprises 8 unrolled rounds of pipelined Threefish block cipher 204. The pipelined architecture of the unrolled rounds of the Threefish block cipher 204 allows for parallel computation of two independent hashes from two input messages. To keep the hardware pipeline of the Threefish block cipher 204 filled with two independent messages during each cycle of sclk, two subkeys—skeven and skodd—are provided to the Threefish block cipher 204. In one embodiment, the two subkeys are 512 bits long and generated by the two key schedulers 202.

Figure 3:
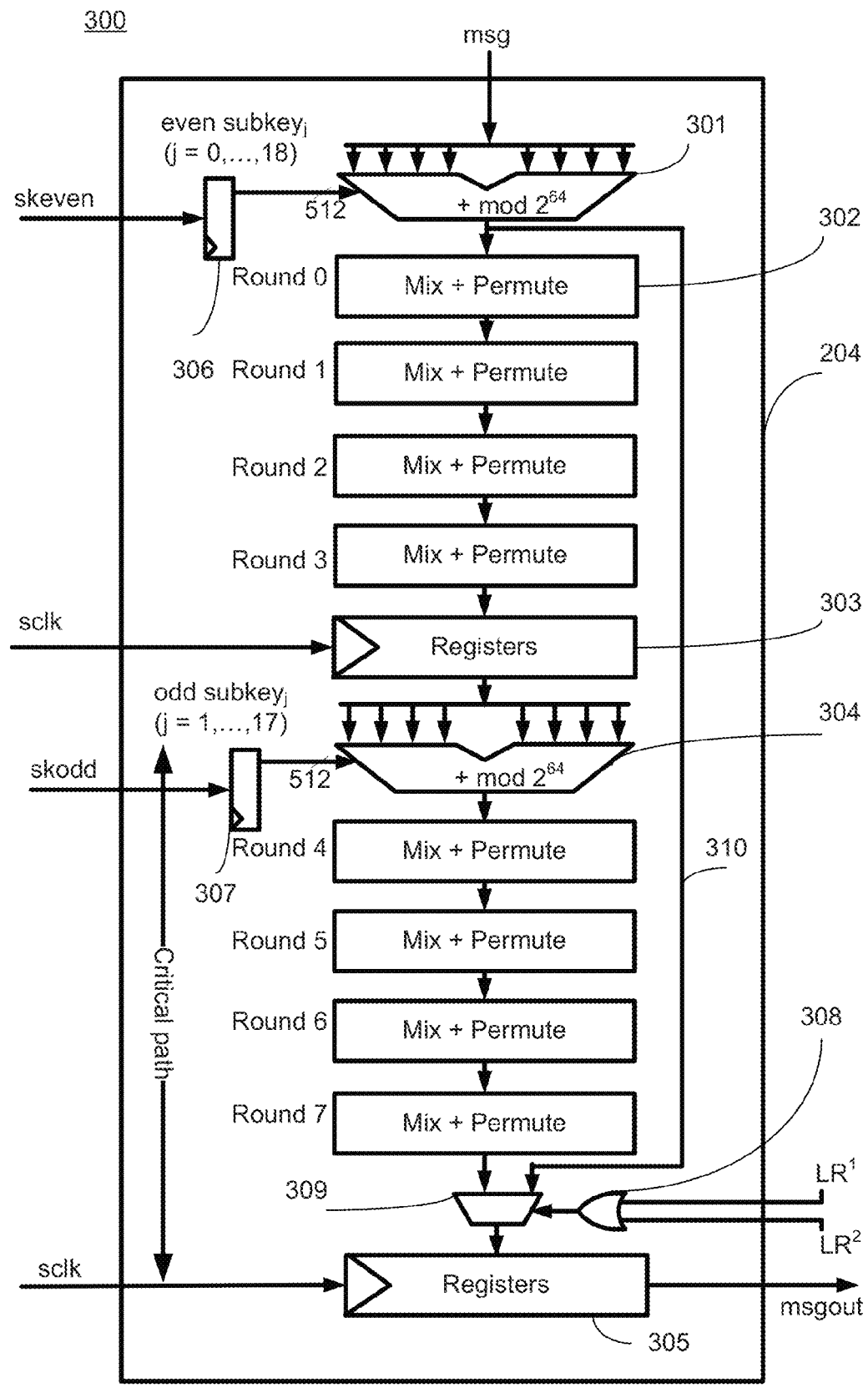
FIG. 3 is a high level hardware implementation of a block cipher, according to one embodiment of the invention.

FIG. 3 is a high level hardware implementation 300 of the block cipher 204, according to one embodiment of the invention. In one embodiment, the block cipher 204 comprises 8 mix and permute logic units 302 and 16 64 bit modulo-$2^{64}$ adders 301 and 304. In one embodiment, the block cipher 204 comprises a set of registers 303 for pipelining the data path (path from adder 301 to register block 305) after every 4 rounds of mix and permute operations. In one embodiment, parallelism can be increased by inserting registers into the data path pipeline at every one or two rounds.

Figure 4:
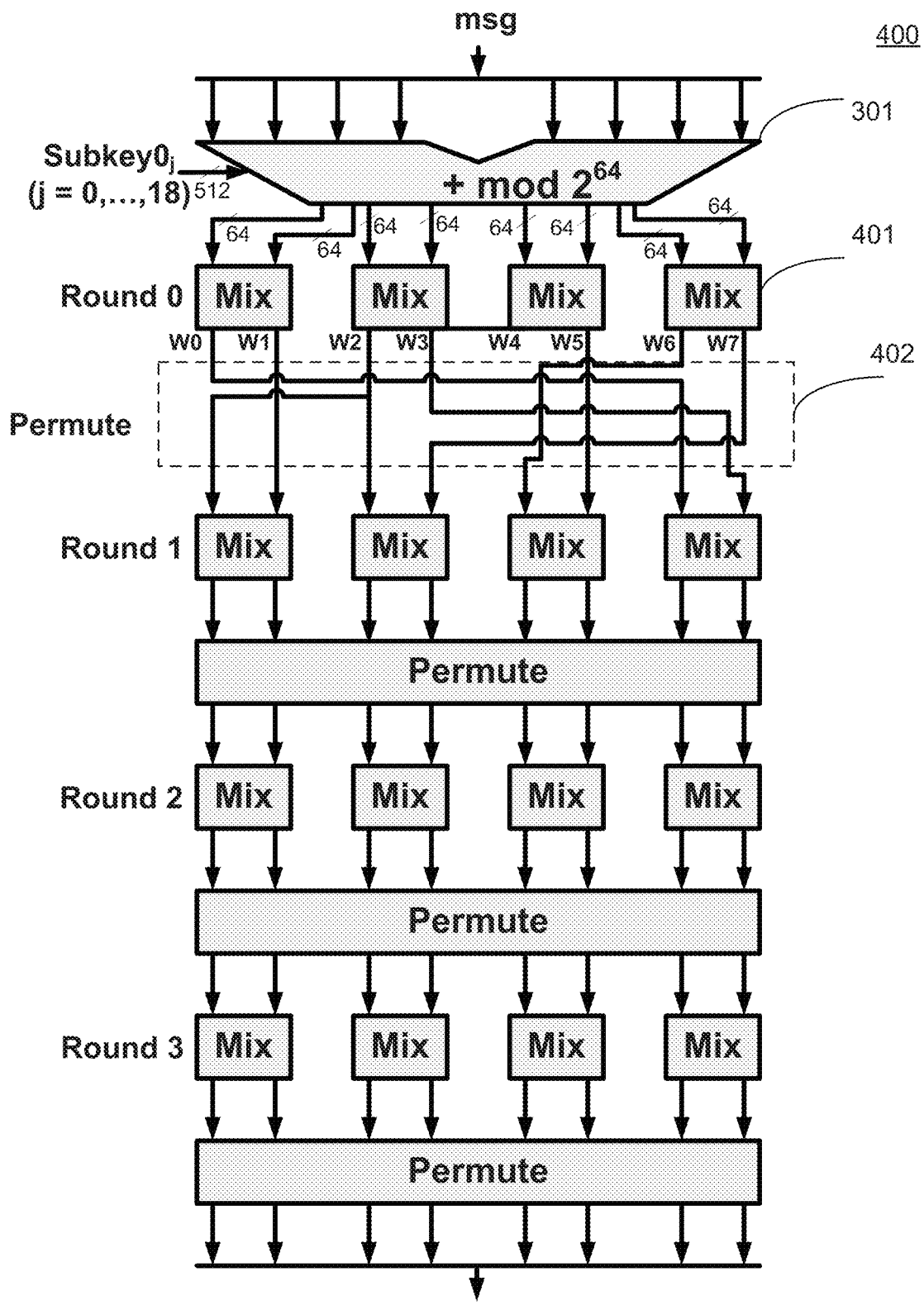
FIG. 4 is a low level hardware implementation of four rounds of mix and permute logic units in the block cipher, according to one embodiment of the invention.

FIG. 4 is a low level hardware implementation 400 of the four rounds of mix and permute logic units in the block cipher 204, according to one embodiment of the invention. In one embodiment, each round of mix and permute logic unit 302 comprises 4 mix logic units 401 and a permute logic unit 402. In one embodiment, the data path of the 8 round Threefish block cipher comprises 32 mix logic units (4 mix logic units per round). In one embodiment, for Skein-512 hardware implementation 200, a total of 32 rotation constants are required which are hard-coded into each of the 32 mix logic units. In one embodiment, each round consists of four parallel 64 bit by 64 bit mix logic units followed by a permutation of the eight 64 bit words of the output of the mix logic units.

FIG. 5A is a hardware implementation of a mix logic unit 500/401 as used in the block cipher 204, according to one embodiment of the invention. In one embodiment, the mix logic unit 500/401 comprises a 64 bit modulo-$2^{64}$ adder 501, an exclusive-OR (XOR) logic unit 503, and a logic unit 502 for rotating bits. In one embodiment, the 64 bit modulo-$2^{64}$ adder 501 is a logarithmic adder which is optimized for minimum delay through the critical path (rounds 4-7 of FIG. 3). In other embodiments, other fast adders may be used.

In one embodiment, the logic unit 502 is operable to left rotate input bits 'B' by 'R' bits. In one embodiment, the 64 bit modulo-$2^{64}$ adder 501 adds two 64 bit inputs 'A' and 'B' to generate output 504. In one embodiment, the output 504 is XORed, by XOR logic unit 503, with the left rotated output of input 'B.' In one embodiment, the output 504 'C' and the output 'D' of the XOR logic unit 503 is input to a permute logic unit 402.

FIG. 5B is a hardware implementation of a permute logic unit 510 for 256 bit word, according to one embodiment of the invention. The embodiment of FIG. 5B is used in Threefish-256 block ciphers. The permutation function by the permute logic unit 510 is accomplished via signal routing as shown in FIG. 5B. In such an embodiment, "Word 0" and "Word 1" correspond to outputs 'C' and 'D' of the mix logic unit 500/401 of FIG. 5A.

FIG. 5C is a hardware implementation of a permute logic unit 520 (same as 402 of FIG. 4) for 512 bit word, according to one embodiment of the invention. The permutation function by the permute logic unit 510 is accomplished via signal routing as shown in FIG. 5C. In such an embodiment, "Word 0" and "Word 1" correspond to outputs 'C' and 'D' of the mix logic unit 500/401 of FIG. 5A.

Referring back to FIG. 3, in one embodiment after every four rounds of mix and permute logic operations, eight parallel 64 bit modulo-$2^{64}$ adders 304 compute the addition of the 512 bit input word with a new 512 bit subkey generated using a 128 bit tweak and a 512 bit key. In one embodiment, 4 Threefish block cipher rounds and one addition of the input word with the subkey are computed during each main clock cycle (same as sclk).

In one embodiment, the block cipher 204 further comprises two registers 306 and 307 to store the even and odd keys respectively. In one embodiment, a final addition of the 512 bit data input "msg" and final subkey follows 72 rounds of mix and permute logic operations as shown by reference signs 301, 310, 308 and 309.

In one embodiment, the output of the second stage of registers 305 is controlled by signals LR1 and LR2. In one embodiment, the signals LR1 and LR2 are generated by the control logic unit 203. In one embodiment, signals LR1 and LR2 are asserted after 19 and 20 cycles, respectively. As mentioned above, the block cipher 204 is operable to generate hash output of two input messages (message 1 and message 2) in parallel. In one embodiment, if LR1 is asserted (i.e., logical high level) then it represents the last round for message 1. In one embodiment, if LR2 is asserted then it represents the last round of message 2. In one embodiment, both LR1 and LR2 are input to a logical OR gate 308. In one embodiment, if LR1 or LR2 is high, then output 310 of the addition after 72 rounds is fed directly to the registers 305, else the output of the round 7 permute logic block is fed to the second set of registers 305.

Referring back to FIG. 2, the Skein hardware 200 is configured to operate the logic units by means of two clock signals, sclk and mclk, where sclk has a frequency which is faster than the frequency of mclk. In one embodiment, sclk is the main clock which is used to operate/clock the 8-round pipelined Threefish block cipher 204 datapath, the key schedulers 202, and the control logic 203. In one embodiment, mclk is clocked at the same frequency as sclk for two cycles but then falls silent for the next 18 cycles of sclk, as shown in the timing diagram of FIG. 9.

Figure 8A:
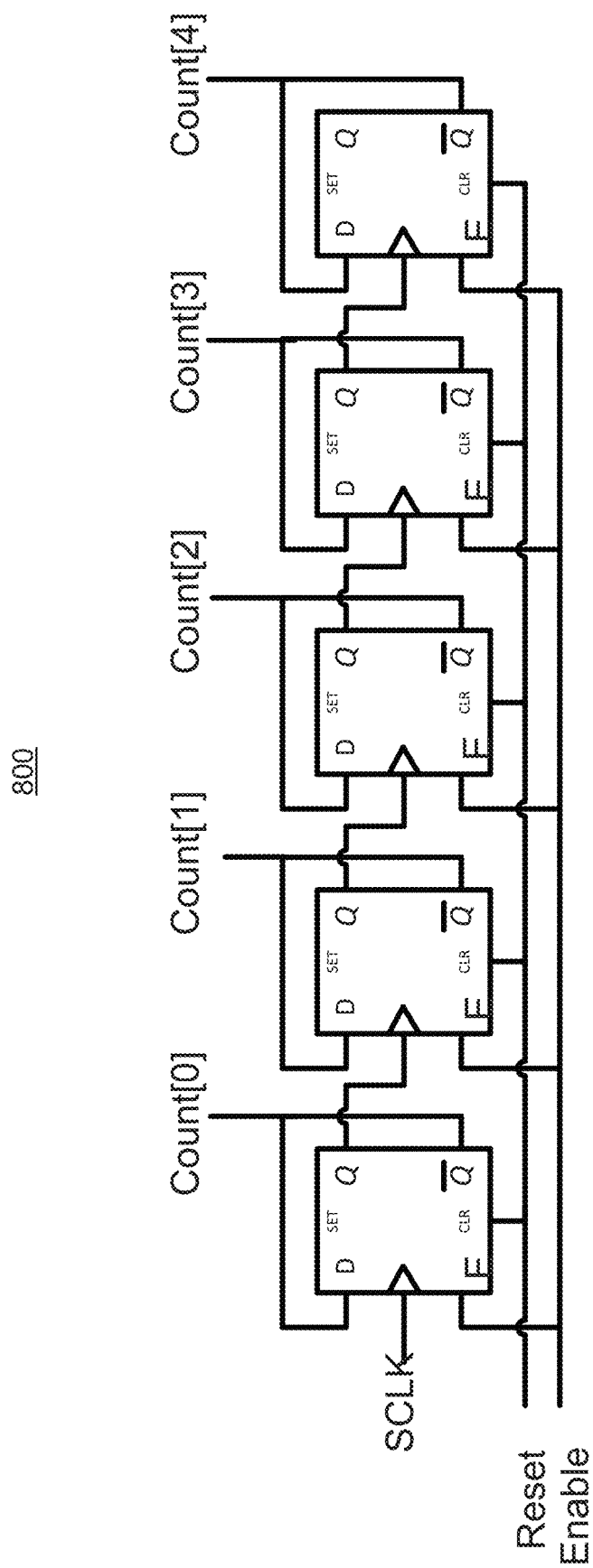
FIG. 8A illustrates a 5-bit counter of the control logic unit of the Skein hashing function, according to one embodiment of the invention.
Figure 8B:
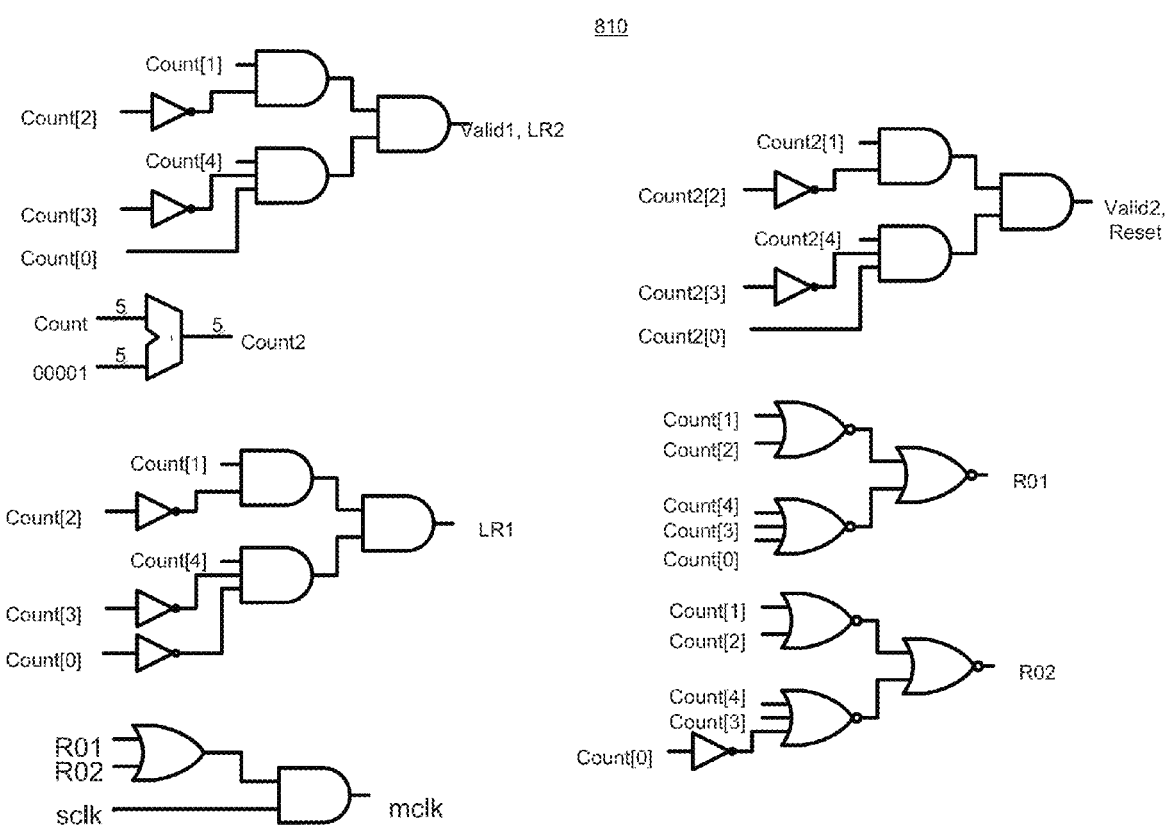
FIG. 8B illustrates logic units of the control logic unit for generating control signals to control the operation of the block cipher, according to one embodiment of the invention.

In one embodiment, the control logic unit 203 comprises a 5 bit counter 800 as shown in FIG. 8A. In one embodiment, all control signals (valid1, valid2, LR1, LR2, R01, R02, count0, reset, mclk) of the embodiment of FIG. 2 are generated by the 5 bit counter 800 as shown by the combination logic units 810 of FIG. 8B. In such an embodiment, the hardware design for implementing the Skein hashing function is simplified because it does not require a complicated finite state machine, instead 5 flip-flops or latches and simple combinational logic units are used to sequence the three UBI modes of FIG. 1. In one embodiment, the counter 800 tracks the round number of the block cipher 204 and is reset every 20 sclk cycles. In one embodiment, R01 and R02 signals are generated by the control logic unit 203 to control the output of the multiplexers 209 and 210 of FIG. 2. In one embodiment, R01 is high when the round count of the block cipher 204 is zero and R02 is high when round count is 1. In one embodiment, the control logic unit generates valid1 and valid2 signals when the count value of the 5 bit counter 800 reaches 20 for m1 and 21 for m2 (m1 and m2 of FIG. 9), signifying that the message digest 110 of FIG. 2 is valid.

Referring back to FIG. 2, the Skein hardware 200 further comprises registers 205 and 210 to store two messages (m1 and m2 of FIG. 9), each 512 bit long (message 106') thus enabling parallel hashing of two independent messages (m1 and m2) by the block cipher 204. In one embodiment, during the first sclk cycle, input message m1 is latched into the register 205 and is fed ("msg") into the block cipher 204 where the "msg" is added to the incoming subkey from "skeven." In one embodiment, in the second sclk cycle, the second register 210 latches the output of the register 205. In such an embodiment, the second register 210 stores/holds the output of the register 205 for 72 rounds (19 sclk cycles) so that the output of the register 205 can be XORed, by the XOR logic unit 207, with the output 212 of the block cipher 204. In one embodiment, the output of the XOR logic unit 207 is the message digest 110 which is the hashed output.

In one embodiment, when the first message m1 is latched into register 210, a second message m2 is latched into register 205 so that the block cipher 204 may process m2 at the start of the second sclk cycle. In such an embodiment, parallel processing is achieved which improves the performance of the Skein hardware 200. The embodiments described herein achieve orders of magnitude greater throughput (greater than 5×) over prior art implementations. In one embodiment, the Skein hardware 200 further comprises multiplexers 209 and 208 to provide even and odd keys respectively at every rising edge of count0 (same as count[0] of FIG. 8A) and count0b signals, where count0b is an inverse of count0 signal. In one embodiment, the multiplexer 211 is operable to control which input is used for the key schedulers 202 to generate the subkeys. In one embodiment, at round 0 (first round) of a new message (i.e. RO1 is high or RO2 is high for the initial UBI and tweak[126] is high) input key, "key" is selected by the multiplexer 211 to generate the subkeys. In one embodiment, in rounds other than the first round, the output 110 from the XOR logic unit 207 is used for the next UBI chaining step.

In one embodiment, multiplexer 206 is operable to control the feedback 212 from the output of the 8 rounds of Threefish block cipher 204. In one embodiment, when the Threefish block cipher 204 has not yet completed 72 rounds (i.e. count is not 0 (msg 1) or 1 (msg 2), then the feedback signal 212 is selected as input to the 8 round Threefish, otherwise a new message is selected as input by the multiplexer 206.

In one embodiment, a new subkey is delivered to the 8-round Threefish block cipher 204 every sclk cycle from the key schedulers 202. In one embodiment, when count[0] is low, even subkey (skey1) for m1 is selected by the multiplexer 209 and is input to the first set of adders 301. In such an embodiment, odd subkey (skey2) for m2 is selected by multiplexer 208 and is input to the second set of adders 304. In one embodiment, when count[0] is high (i.e., count0b low) even subkey (skey2) for m2 is selected by multiplexer 209 and is input to the first set of adders 301. In such an embodiment, odd subkey (skey1) for m1 is selected by the multiplexer 208 and is input to the second set of adders 304.

Figure 6A:
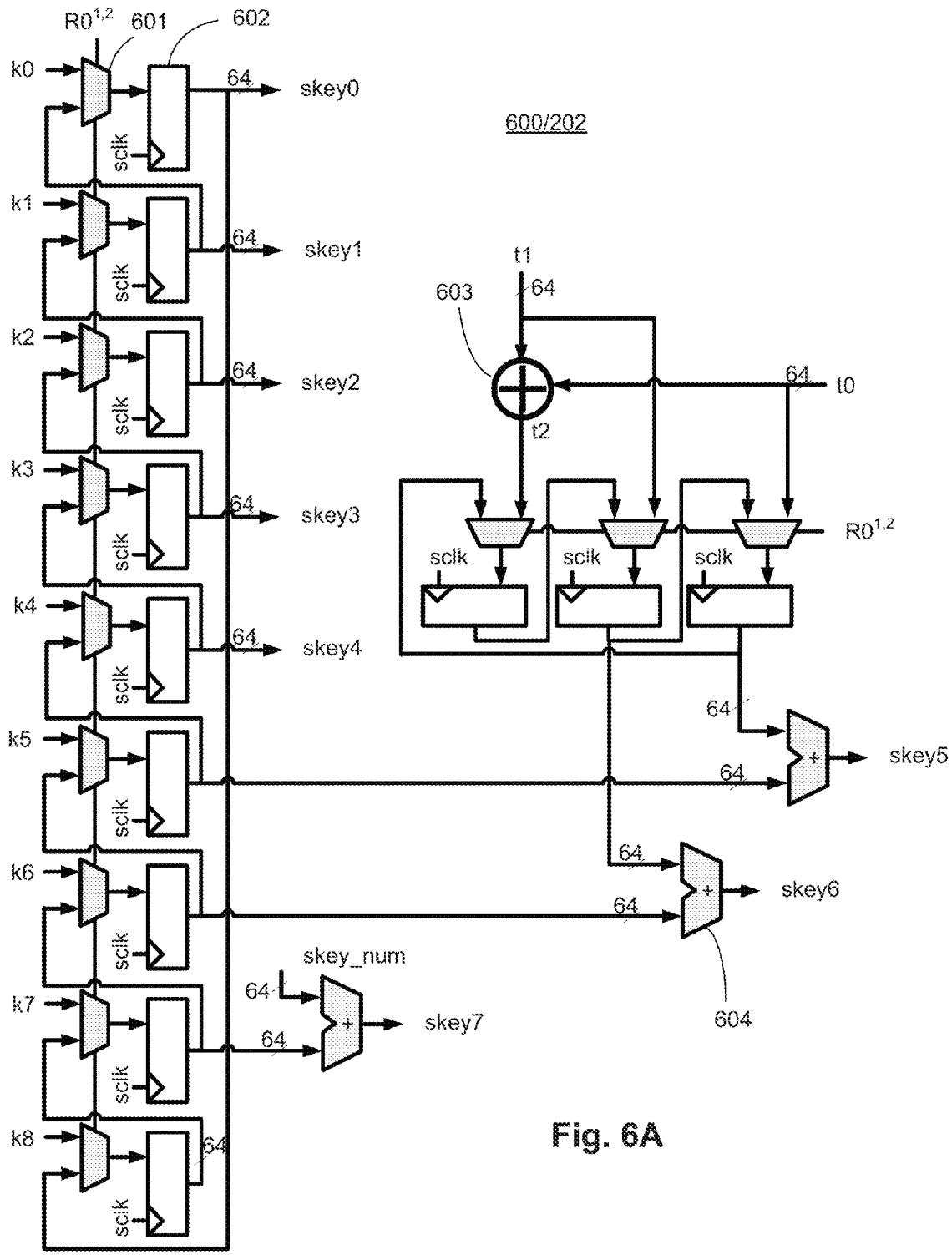
FIG. 6A is a hardware implementation of a key scheduler of the Skein hashing function hardware, according to one embodiment of the invention.

FIG. 6A is a hardware implementation of a key scheduler 600/202 of the Skein hashing function hardware 200, according to one embodiment of the invention. In one embodiment, 8 keys are generated by the key scheduler 600/202 comprising multiplexer 601, registers 602, adders 604, and an XOR logic unit 603. In one embodiment, at the start of each UBI invocation (i.e., UBI calls from FIG. 1), each tweak generator 201 constructs a 128 bit tweak that is input into each key scheduler 600/202. In one embodiment, each key scheduler 600/202 computes a 512 bit subkey based on the 512 bit input key and the 128 bit tweak. In one embodiment, the key scheduler 600/202 operates using the main clock, sclk. In one embodiment, during each sclk cycle, each key scheduler 600/202 creates the next 512 bit subkey, which is input to the 8 round Threefish block cipher 204.

Figure 6B:
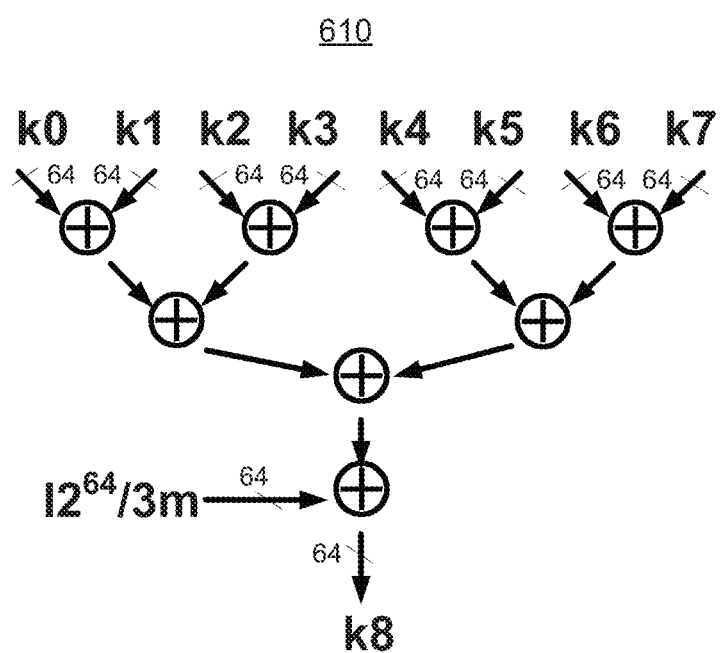
FIG. 6B is a hardware implementation of generating a key, according to one embodiment of the invention.

In one embodiment, in an initial round (first round), the first five 64 bit subkey words (skey0-skey4) are equivalent to the five input 64b key words (k0-k4). In one embodiment, the sixth subkey word, skey5, is generated by adding the first 64 bit tweak work, t0, with the latched k5. In one embodiment, the seventh subkey word skey6 is generated by adding tweak t1 with latched k6. In one embodiment, the eighth subkey work skey7 is generated by adding a subkey number (skey_num e.g., 1, 2, 3, . . . which is dependent on the round number) with latched k7. In one embodiment, tweak t2 is the result of XORing t0 and t1 by the XOR logic unit 603. In one embodiment, in subsequent rounds of mix and permute operations in the block cipher 204, the key words and the tweaks are rotated. In one embodiment, keyword k8 is generated by applying XOR operations on all key words k0-k7 and a constant $C_{240}$=0x1BD11BDAA9FC1A22 as shown by the logical operations of 610 in FIG. 6B. In one embodiment, the constant $C_{240}$ ensures that the extended key cannot be all zeros. One reason for the constant $C_{240}$ is that it provides defense against rotational attacks. In one embodiment, the $C_{240}$ constant is the Advance Encryption Standard (AES) encryption of the plaintext 240 (in decimal) under the all-zero 256 bit key.

Figure 7:
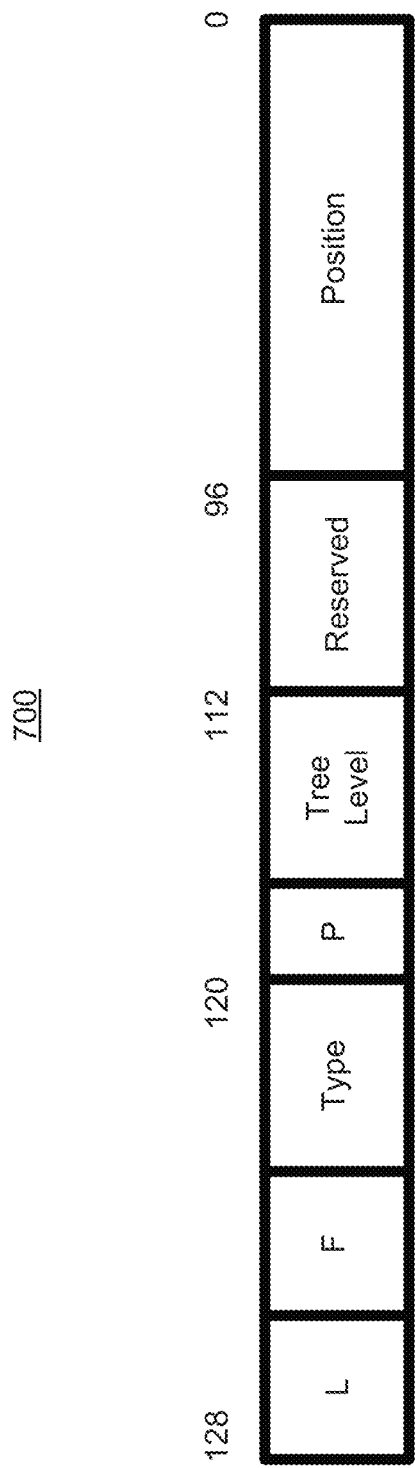
FIG. 7 illustrates how a tweak is generated for the key scheduler, according to one embodiment of the invention.

FIG. 7 illustrates how a tweak is generated by the tweak generator 201 for the key scheduler 600/202, according to one embodiment of the invention. In one embodiment, the tweak generator 201 generates a 128 bit tweak as shown by the 128 bit tweak 700. The components of the tweak 700 are:

'L' (bit 127)='1' for last block of message $M_m$ and '0' otherwise; same as "final" in FIG. 2

'F' (bit 126)='1' for first block M1 and '0' otherwise; same as "first" in FIG. 2

"Type" (bits 120-125)=application specific UBI function being performed; same as "ubi_type" in FIG. 2

'P' (bit 119)='1' if the message block is padded and '0' otherwise; same as "bitpad" in FIG. 2

"Tree Level" (bits 112-118)=level of the tree when tree hashing is used, '0' for non-tree computations.

"Reserved" (bits 96-117)=for future use; must be 0.

"Position" (bits 0-95)=number of bytes of M processed so far; same as "position" in FIG. 2.

In one embodiment, if ubi_type is 1 (ubi_msg) then tweak [125:120]=11000 else if ubi_type is 0 (ubi_out) then tweak [125:120] is 111111. In one embodiment, tweak[119]=bitpad is set to 1 if the message block contains last byte of an input whose length was not an integral number of bytes, otherwise bitpad is set to 0. In one embodiment, tweak[95:0]=position is the number of bytes in the string processed so far, including this block.

Figure 9:
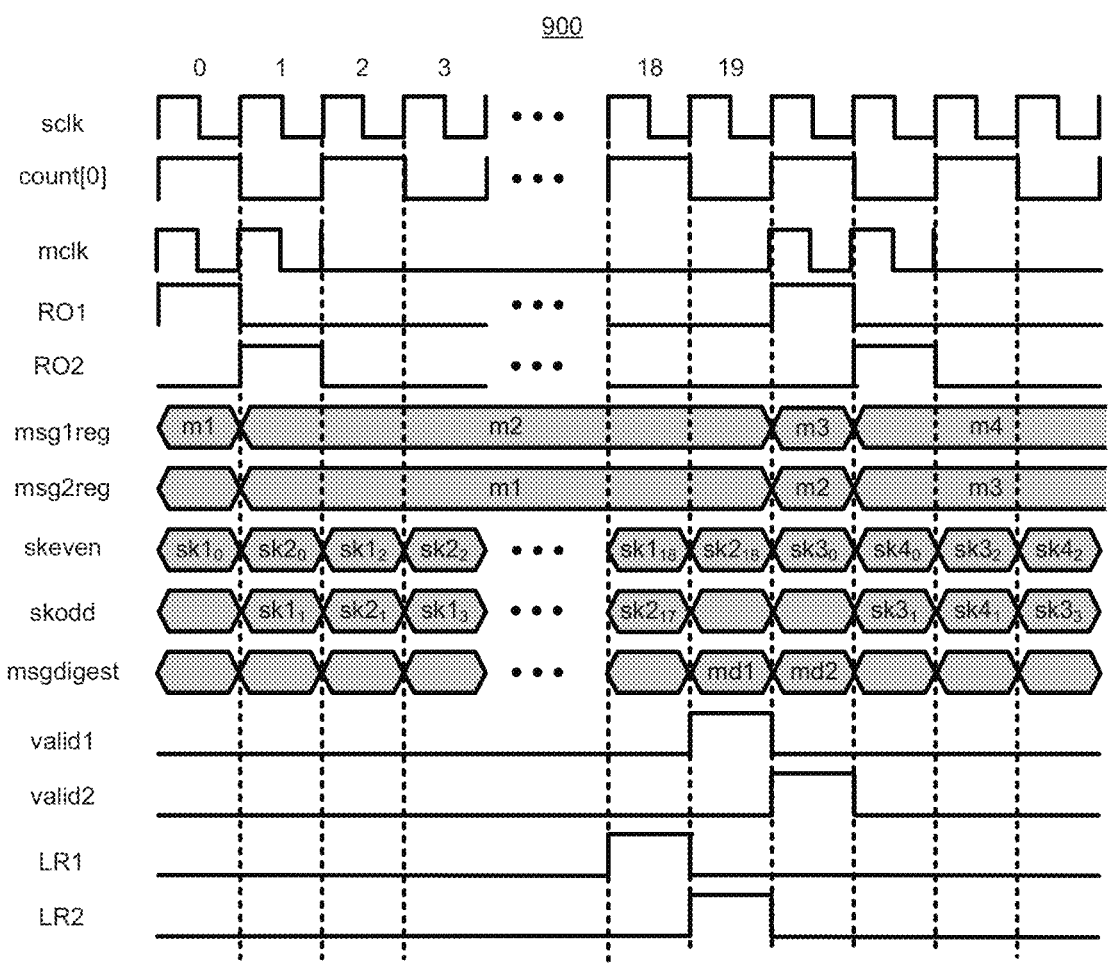
FIG. 9 illustrates a timing diagram of the hardware implementation of the Skien-512 hashing function, according to one embodiment of the invention.

FIG. 9 illustrates a timing diagram 900 of the hardware implementation 200 of the skien-512 hashing function, according to one embodiment of the invention. The timing diagram 900 is discussed with reference to FIGS. 1-8.

The timing diagram illustrates the 72 rounds of Threefish block cipher operation by the Threefish block cipher 204. As mentioned above, sclk is the main clock for the Skein hardware 200. In one embodiment, 72 rounds of mix and permute operation by the Threefish block cipher 204 is performed in 19 sclk cycles. The signal count[0] is the first bit of the counter 800 and is generated by dividing sclk by two. Mclk is derived from sclk by clocking sclk for two cycles and then keeping mclk at logical zero level for the next 18 cycles of sclk.

In one embodiment, during the first sclk cycle, input message m1 is latched into the register 205 (msg1reg) and is fed ("msg") into the block cipher 204 where the "msg" is added to the incoming subkey from "skeven." In one embodiment, in the second sclk cycle, the second register 210 (msg2reg) latches the output of the register 205 (msg1reg). In such an embodiment, the second register 210 stores/holds the output of the register 205 (msg1reg) for 72 rounds (19 sclk cycles) so that the output of the register 205 can be XORed, by the XOR logic unit 207, with the output of the block cipher 212. In one embodiment, the output of the XOR logic unit 207 is the message digest 110 (msgdigest) which is the hashed output.

In one embodiment, when the first message m1 is latched into register 210, a second message m2 is latched into register 205 so that the block cipher 204 may process m2 at the start of the second sclk cycle.

Signal LR1 is asserted (i.e., logical high level) during the last round of mix and permute operations for m1 at sclk cycle 18. Signal LR2 is asserted during the last round of m2 at sclk cycle 19. As mentioned above, in one embodiment, if LR1 or LR2 is high, then output 310 of the addition after 72 rounds is fed directly to the registers 305, else the output of the round 7 permute logic block is fed to the second set of registers 305.

In one embodiment, a new subkey is delivered to the 8-round Threefish block cipher 204 every sclk cycle from the key schedulers 202. In one embodiment, when count[0] is low, even subkey (skeven) for m1 is input to the first set of adders 301. In such an embodiment, odd subkey (skodd) for m2 is input to the second set of adders 304. In one embodiment, when count[0] is high even subkey (skeven) for m2 is input to the first set of adders 301. In such an embodiment, odd subkey (skodd) for m1 is selected by the multiplexer 208 and is input to the second set of adders 304. In one embodiment, the control logic unit generates valid1 and valid2 signals when the count value of the 5 bit counter 800 reaches 20 for m1 and 21 for m2 (m1 and m2 of FIG. 9), signifying that the message digest 110 of FIG. 2 is valid.

Figure 10:
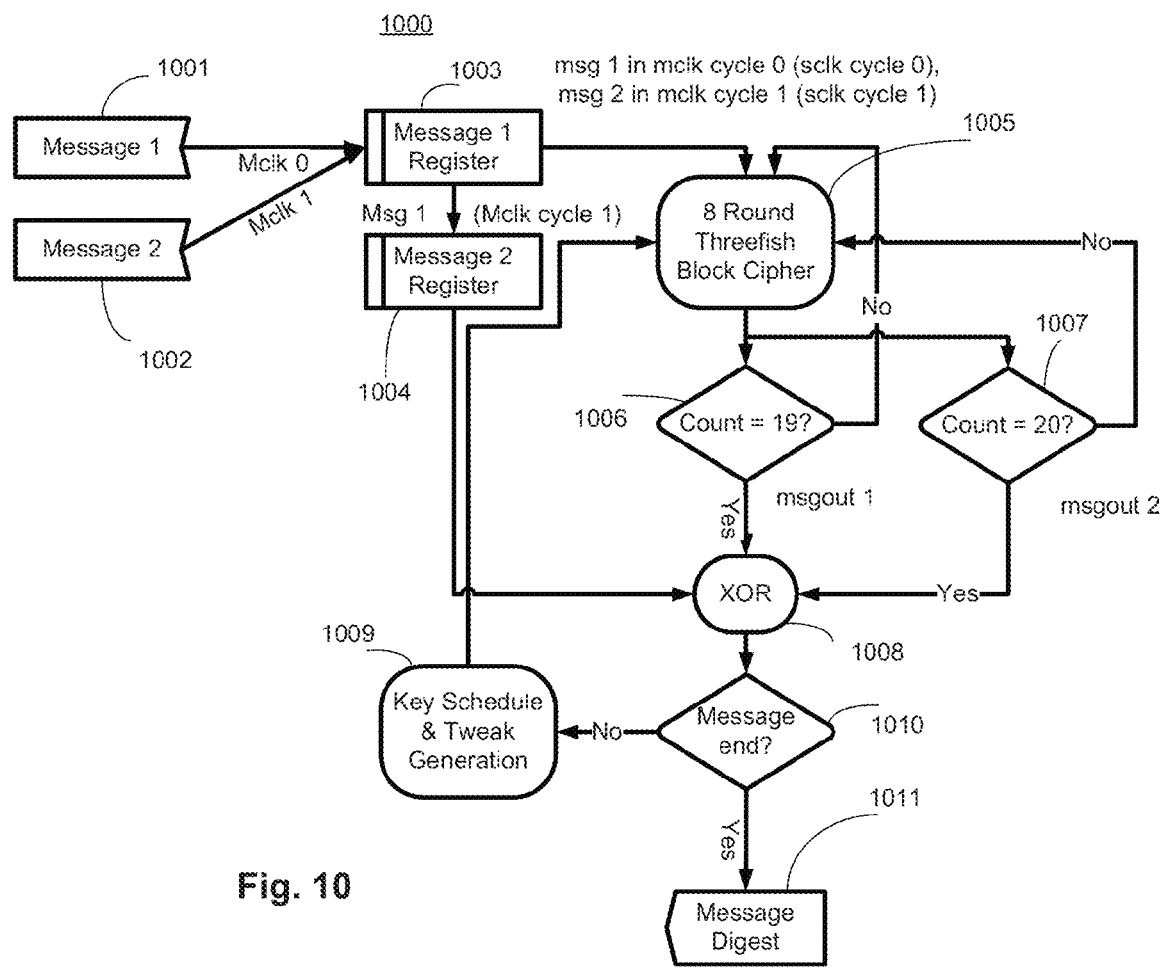
FIG. 10 is a method flow chart representing the timing diagram, according to one embodiment of the invention.

FIG. 10 is a high level method flow chart 1000 representing the timing diagram 900, according to one embodiment of the invention. The flow chart 1000 is described with reference to FIGS. 2-9. At block 1003, message 1 1001, also referred above as m1, is latched by the first register 205 in the first mclk cycle (also cycle 0 of sclk). At block 1004, m1 is latched into the second register 210 in the second mclk cycle (also cycle 1 of sclk). During the second mclk cycle, the second message 2 1002, also referred to as m2, is latched by the first register 205. At block 1005, block cipher hashing operation is performed by the 8 round Threefish block cipher 204. At block 1006, a determination is made whether the count value of the counter 800 is 19. If the count value is 19, then at block 1008 m1 is XORed with the output msgout1 of the block cipher 204. If the count value is not 19, (i.e., 72 rounds of mix and permute operations have not ended) then the block cipher hashing operation continues in block 1005.

At block 1007, a determination is made whether the count value is 20. If the count value is 20, then the block cipher has completed the parallel hashing operation on m2. If the count value is 20, then the output msgout2 of the block cipher 204 is XORed at block 1008 with the m2 (which is now stored in register 210). At block 1010, a determination is made whether the entire message 106 (i.e., all its equally sized chopped blocks) has been hashed. If more blocks of message 106 remain to be hashed, then new keys and tweaks are generated at block 1009 for the block cipher 204. If all blocks of the message 106 are hashed, then a final message digest 110 is output at block 1011.

Figure 11:
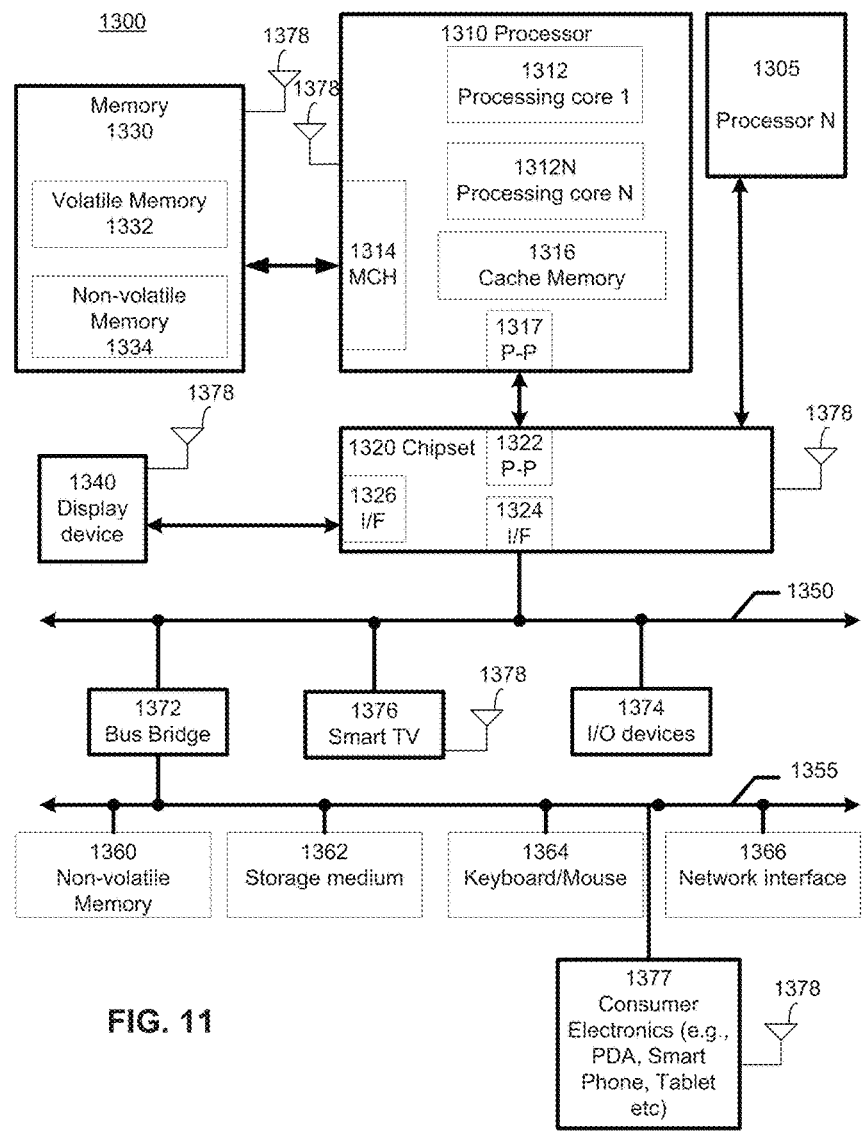
FIG. 11 illustrates a system level diagram having the apparatus for Skein hashing, according to one embodiment of the invention.

FIG. 11 illustrates a system level diagram having the Skein hardware 200, according to one embodiment of the invention. FIG. 11 also includes a machine-readable storage medium to execute computer readable instructions to perform the methods of various embodiments. Elements of embodiments are also provided as a machine-readable medium (e.g., 1362) for storing the computer-executable instructions (e.g., instructions to implement the flowcharts/timing diagram of FIGS. 9-10). The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic or computer-executable instructions. For example, embodiments of the invention may be downloaded as a computer program (e.g., BIOS) which may be transferred from a remote computer (e.g., a server) to a requesting computer (e.g., a client) by way of data signals via a communication link (e.g., a modem or network connection).

In one embodiment, the system 1300 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In another embodiment, the system 1300 implements the methods disclosed herein and may be a system on a chip (SOC) system.

In one embodiment, the processor 1310 has one or more processing cores 1312 and 1312N, where 1312N represents the Nth processor core inside the processor 1310 where N is a positive integer. In one embodiment, the system 1300 includes multiple processors including 1310 and 1305, where processor 1305 has logic similar or identical to logic of processor 1310. In one embodiment, the processing core 1312 includes, but is not limited to, pre-fetch logic to fetch instructions, decode logic to decode the instructions, execution logic to execute instructions and the like. In one embodiment, the processor 1310 has a cache memory 1316 to cache instructions and/or data of the system 1300. In another embodiment of the invention, the cache memory 1316 includes level one, level two and level three, cache memory, or any other configuration of the cache memory within the processor 1310.

In one embodiment, processor 1310 includes a memory control hub (MCH) 1314, which is operable to perform functions that enable the processor 1310 to access and communicate with a memory 1330 that includes a volatile memory 1332 and/or a non-volatile memory 1334. In one embodiment, the MCH 1314 is the same as the memory controller 101 of the embodiments discussed herein.

In one embodiment, the processor 1310 is operable to communicate with the memory 1330 and a chipset 1320. In one embodiment, the processor 1310 is also coupled to a wireless antenna 1378 to communicate with any device configured to transmit and/or receive wireless signals. In one embodiment, the wireless antenna interface 1378 operates in accordance with, but is not limited to, the IEEE 802.11 standard and its related family, HomePlug AV (HPAV), Ultra Wide Band (UWB), Bluetooth, WiMAX, or any form of wireless communication protocol.

In one embodiment, the volatile memory 1332 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 1334 includes, but is not limited to, flash memory, phase change memory (PCM), read-only memory (ROM), electrically erasable programmable read-only memory (EEPROM), or any other type of non-volatile memory device.

The memory 1330 stores information and instructions to be executed by the processor 1310. In one embodiment, memory 1330 may also store temporary variables or other intermediate information while the processor 1310 is executing instructions. In one embodiment, chipset 1320 connects with processor 1310 via Point-to-Point (PtP or P-P) interfaces 1317 and 1322. In one embodiment, chipset 1320 enables processor 1310 to connect to other modules in the system 1300. In one embodiment of the invention, interfaces 1317 and 1322 operate in accordance with a PtP communication protocol such as the Intel® QuickPath Interconnect (QPI) or the like.

In one embodiment, the chipset 1320 is operable to communicate with the processor 1310, 1305, display device 1340, and other devices 1372, 1376, 1374, 1360, 1362, 1364, 1366, 1377, etc. In one embodiment, the chipset 1320 is also coupled to a wireless antenna 1378 to communicate with any device configured to transmit and/or receive wireless signals.

In one embodiment, chipset 1320 connects to a display device 1340 via an interface 1326. In one embodiment, the display 1340 includes, but is not limited to, liquid crystal display (LCD), plasma, cathode ray tube (CRT) display, or any other form of visual display device. In one embodiment of the invention, processor 1310 and chipset 1320 are merged into a single SOC. In addition, the chipset 1320 connects to one or more buses 1350 and 1355 that interconnect various modules 1374, 1360, 1362, 1364, and 1366. In one embodiment, buses 1350 and 1355 may be interconnected together via a bus bridge 1372 if there is a mismatch in bus speed or communication protocol. In one embodiment, chipset 1320 couples with, but is not limited to, a non-volatile memory 1360, a mass storage device(s) 1362, a keyboard/mouse 1364, and a network interface 1366 via interface 1324, smart TV 1376, consumer electronics 1377, etc.

In one embodiment, the mass storage device 1362 includes, but is not limited to, a solid state drive, a hard disk drive, a universal serial bus flash memory drive, or any other form of computer data storage medium. In one embodiment, network interface 1366 is implemented by any type of well known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, HomePlug AV (HPAV), Ultra Wide Band (UWB), Bluetooth, WiMAX, or any form of wireless communication protocol.

While the modules shown in FIG. 11 are depicted as separate blocks within the system 1300, the functions performed by some of these blocks may be integrated within a single semiconductor circuit or may be implemented using two or more separate integrated circuits. For example, although the cache memory 1316 is depicted as a separate block within the processor 1310, the cache memory 1316 can be incorporated into the processor core 1312 respectively. In one embodiment, the system 1300 may include more than one processor/processing core in another embodiment of the invention.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

While the invention has been described in conjunction with specific embodiments thereof, many alternatives, modifications and variations of such embodiments will be apparent to those of ordinary skill in the art in light of the foregoing description. One such alternative is the hardware implementations of Skien-256 and Skein-1024 based on the hardware implementation of Skein-516 discussed with reference FIGS. 2-10. In one embodiment, for a Threefish block cipher which is configured to apply the block cipher on 256 bit input data, 2 mix logic units per round are used. In such an embodiment, a total of 72 rounds of mix and permute logical operations are performed to generate hash data (message digest). In one embodiment, for a Threefish block cipher which is configured to apply the block cipher on 1024 bit input data, 8 mix logic units are used. In such an embodiment, 80 rounds of mix and permute logical operations are performed to generated hash data (message digest). In other embodiments, the number of rounds of mix and permute operations may be adjusted to generate the message digest.

Figure 12A:
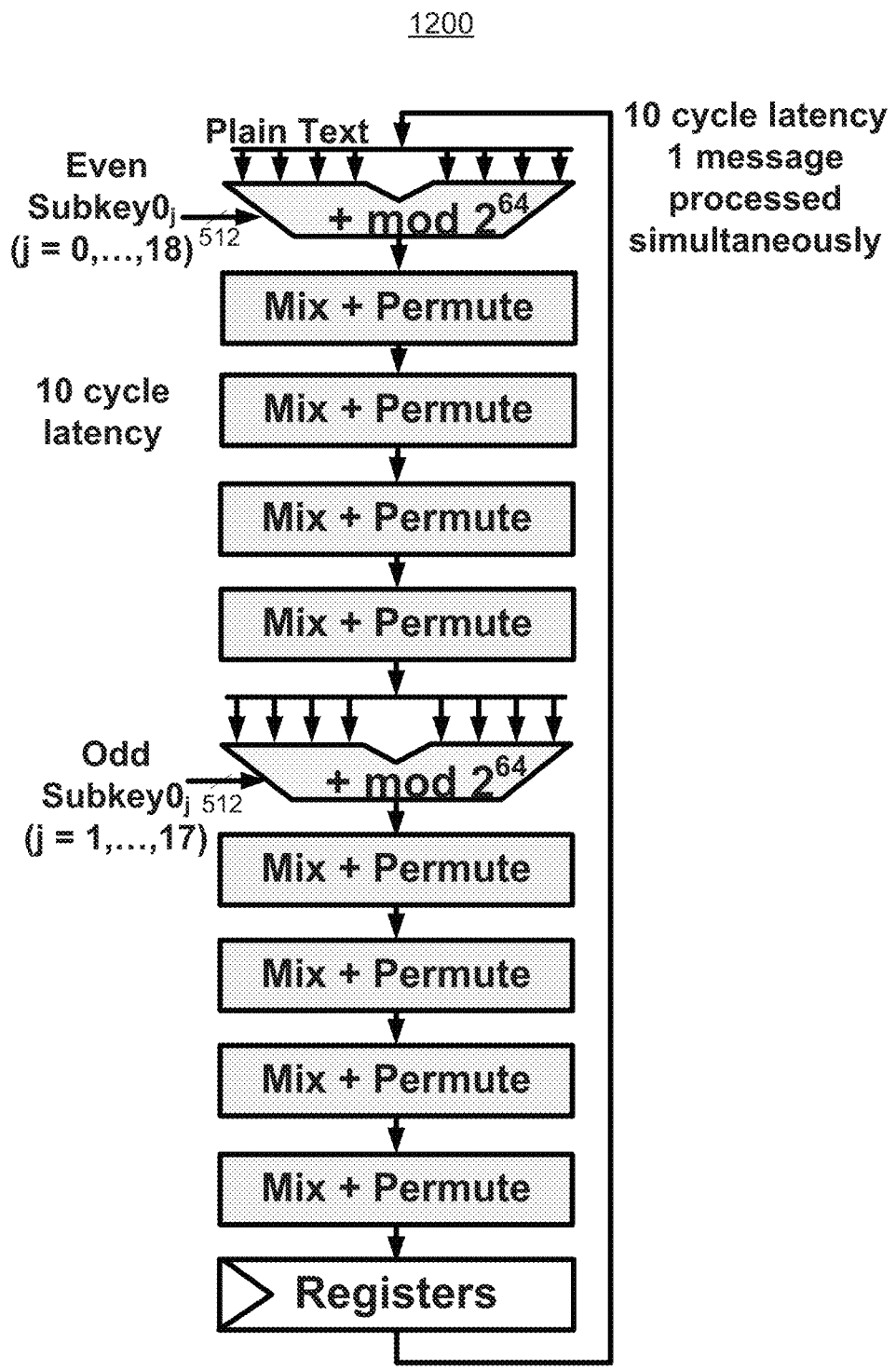
FIG. 12A illustrates a high level hardware implementation of a 8-round Threefish-512 block cipher data path, according to another embodiment of the invention.

FIG. 12A illustrates a high level hardware implementation of a 8-round Threefish-512 block cipher data path 1200, according to another embodiment of the invention. In one embodiment, the 8-round Threefish-512 cipher data path 1200 has no pipelining. In one embodiment, the block 204 of FIG. 2 comprises the 8-round Threefish-512 block cipher data path 1200. In one embodiment, the registers operate on sclk cycles like registers 303 and 305 of FIG. 3. In such an embodiment, a hash of the message is computed once every 10 sclk cycles.

Figure 12B:
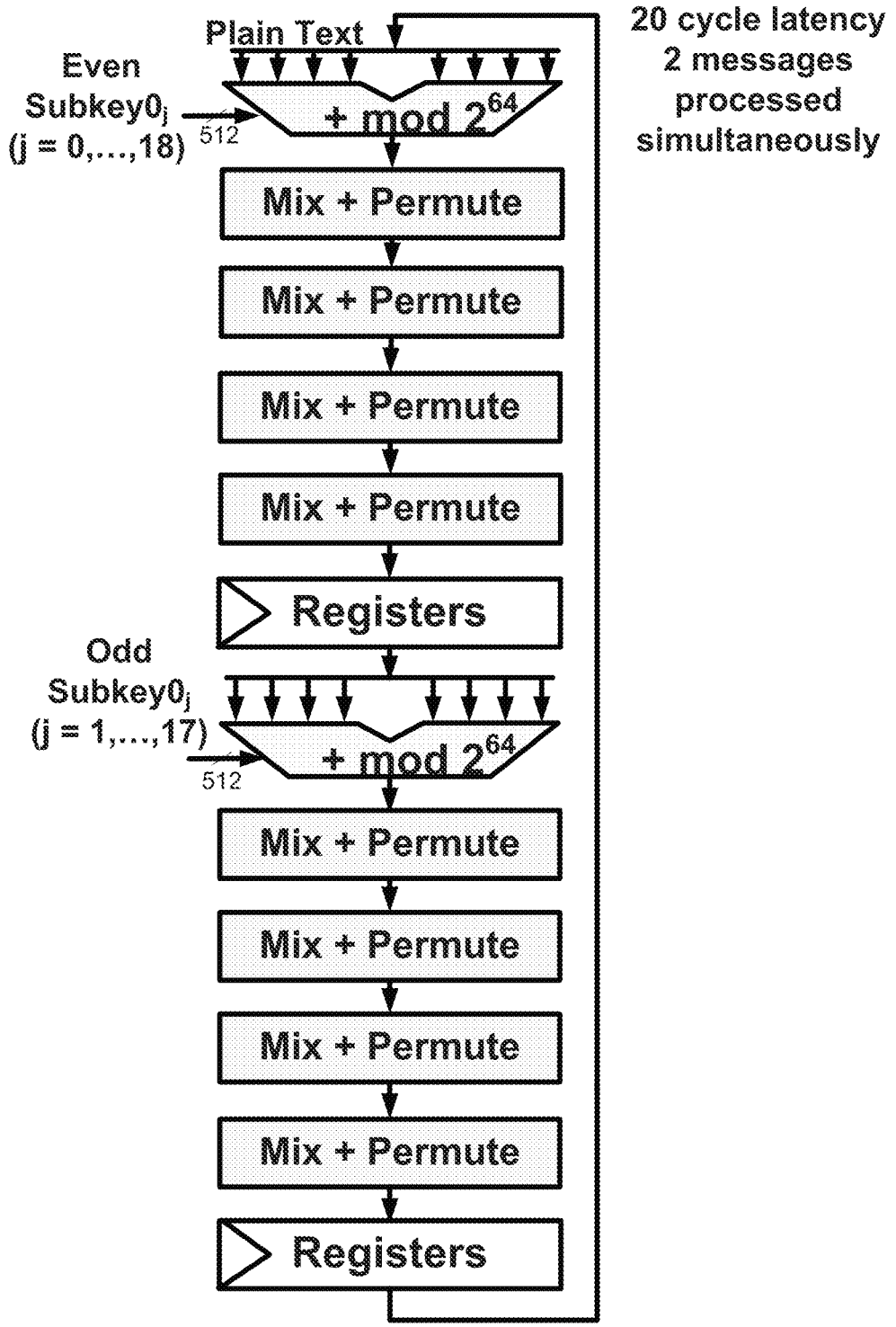
FIG. 12B illustrates a high level hardware implementation of a 8-round Threefish-512 block cipher data path, according to another embodiment of the invention.

FIG. 12B illustrates a high level hardware implementation of a 8-round Threefish-512 block cipher data path 1210, according to another embodiment of the invention. In one embodiment, the 8-round Threefish-512 block cipher data path 1210 is pipelined once so that four rounds execute every sclk cycle. In one embodiment, the block 204 of FIG. 2 comprises the 8-round Threefish-512 block cipher data path 1210. The embodiment of FIG. 12B is similar to FIG. 3. In such an embodiment, the latency is increased to 20 sclk cycles but enables parallel processing of two independent messages. In such an embodiment, the throughput improves by 45% over the embodiment of FIG. 12A.

Figure 12C:
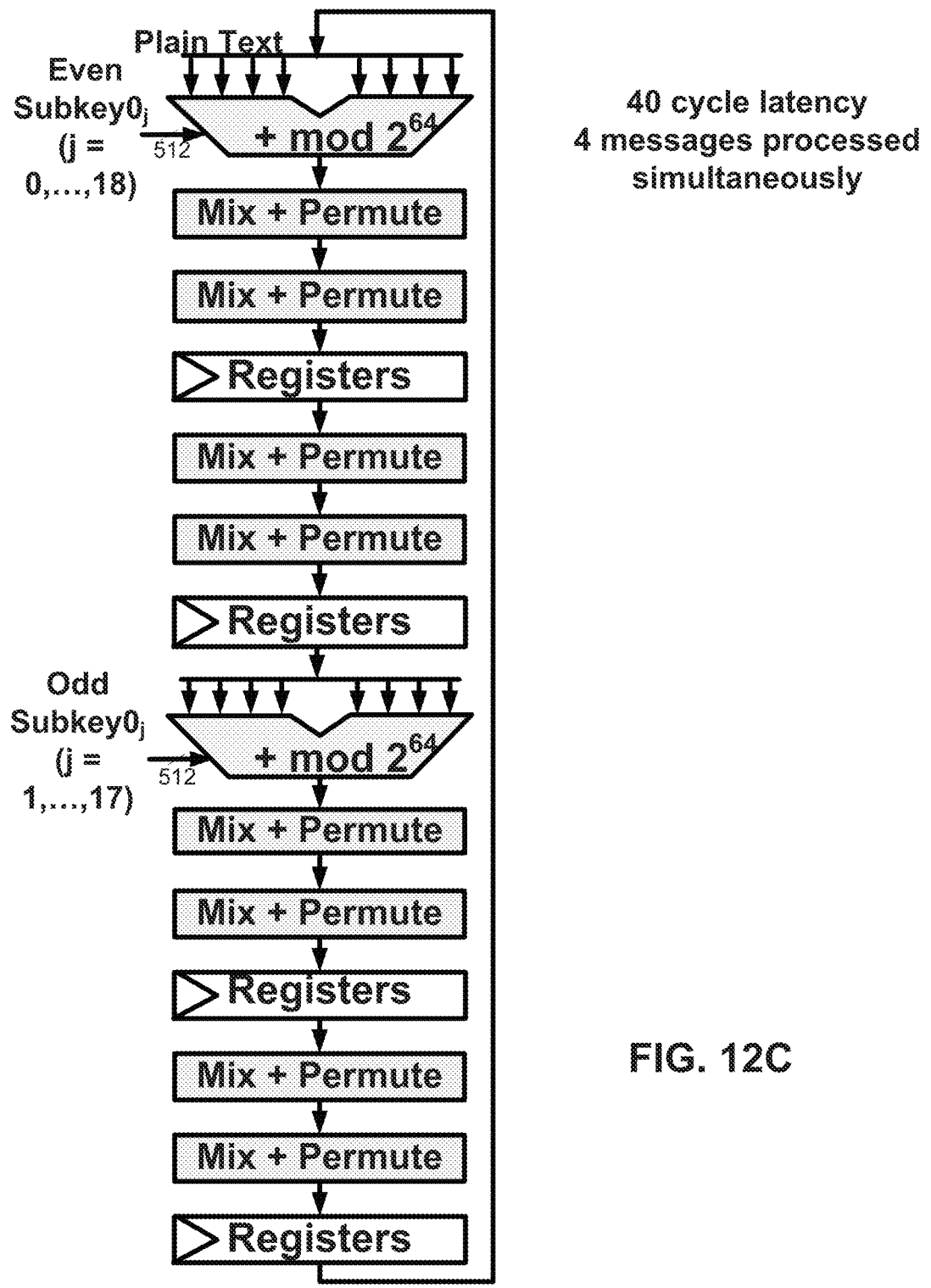
FIG. 12C illustrates a high level hardware implementation of a 8-round Threefish-512 block cipher data path, according to another embodiment of the invention.

FIG. 12C illustrates a high level hardware implementation of a 8-round Threefish-512 block cipher data path 1220, according to another embodiment of the invention. In one embodiment, the 8-round Threefish-512 block cipher data path 1220 is pipelined so that two rounds are processed every sclk cycle resulting in total latency of 40 sclk cycles. In such an embodiment, hashing of four independent messages is computed in parallel, improving throughput by an additional 35%. In one embodiment, when the eight rounds of Threefish-512 block cipher data path are fully pipelined, then it is possible to hash eight messages in parallel with 80-cycle latency, resulting in additional 27% increase in throughput over the embodiment of FIG. 12C. In alternative embodiment, any number of rounds per pipeline stage can be used in the Threefish-512 block cipher 212 of FIG. 2.

The embodiments of the invention are intended to embrace all such alternatives, modifications, and variations as to fall within the broad scope of the appended claims.

Figure 13:
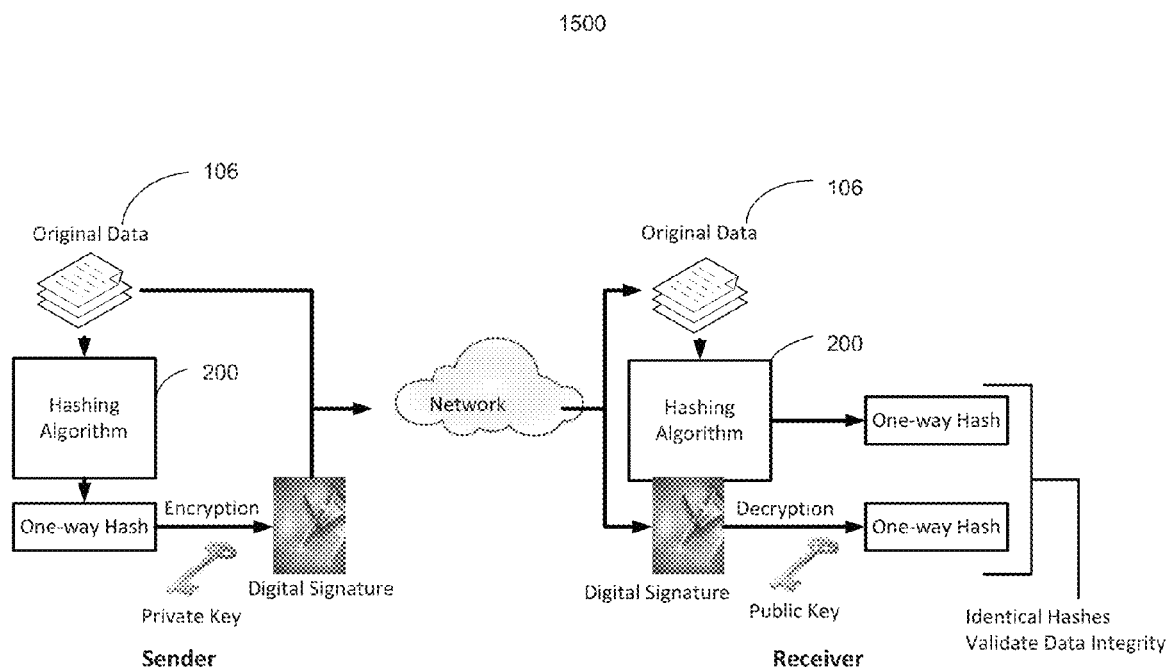
FIG. 13 illustrates a system employing the Skein hashing hardware of FIG. 2, according to one embodiment of the invention.

FIG. 13 illustrates a system 1500 employing the Skein hashing hardware of FIG. 2, according to one embodiment of the invention. In one embodiment, hash functions as implemented by the Skein hashing hardware of FIG. 2 are one of the fundamental primitives provided by cryptography, and can be used in several ways. For example, the hash function as implemented by the Skein hashing hardware of FIG. 2 can be used for digital signature, securing public key encryption, pseudo-random number generation, measured and secure launch, key derivation, message authentication codes, commitment schemes, etc.

In one embodiment, the Skein hashing hardware of FIG. 2 is used to generate digital signatures which are used for authentication in e-commerce, for on-line contracts, on-line audits, etc. In one embodiment, the digital signature uses the hash function, as implemented by 200 of FIG. 2, to compute a unique fingerprint of an item being signed.

In one embodiment, the Skein hashing hardware of FIG. 2 is used for securing public key encryption. Implementations of public key encryption schemes are insecure, because they are necessarily deterministic algorithms. In one embodiment, the Skein hashing hardware of FIG. 2 is used to make these implementations secure by generating padding which is indistinguishable from random. The OEAP used in PKCS #1 is an example of a hash function based padding scheme which is used to make RSA encryption implementations secure.

In one embodiment, the Skein hashing hardware of FIG. 2 is used for pseudo-random number generation. NIST SP 800-56 and SP 800-90 define random number generators based on hash functions. In one embodiment, the Skein hashing hardware of FIG. 2 is used for measured and secure launch as used by trusted computing. In such an embodiment, the computing hardware uses a hash function as implemented by the Skein hashing hardware of FIG. 2 to compute a fingerprint or message digest of the software loaded into memory. In one embodiment, the hardware compares this fingerprint with a fingerprint stored and certified by a digital certificate, which tells whether authorized software has been loaded or whether the software has been replaced by an attacker as illustrated by the system of FIG. 13.

In one embodiment, the Skein hashing hardware of FIG. 2 is used for key derivation. In one embodiment, the Skein hashing hardware of FIG. 2 is used across many applications employing cryptography for key derivation. This includes IPSec, TLS, SSH, XML security, 802.11i, 802.16e, 802.1ae, and nearly any other application that requires cryptographic keys. In one embodiment, the Skein hashing hardware of FIG. 2 is used message authentication codes. In one embodiment, the Skein hashing hardware of FIG. 2 is used to create message authentication codes, which prove message integrity and authenticity, including IPSec, TLS, SSH, and XML security.

In one embodiment, the Skein hashing hardware of FIG. 2 is used for commitment schemes where one proves that one knows some value without explicitly communicating that value. In one embodiment, key derivation combined with message authentication is used for the commitment scheme in which two parties A and B demonstrate they know a key by deriving a session key and using the session key to compute message authentication codes to show proof of possession of the original key.

Referring now to FIG. 13, in one embodiment, the original data 106 and the digital signature, which is a one-way hash of the original data 106 as generated by the hashing hardware 200, is encrypted with the signer's (sender's) private key. In one embodiment, the encrypted data is then sent over a network (wired or wireless) from the sender to a receiver.

In one embodiment, the integrity of the data is validated by using the signer's public key to decrypt the hash. In one embodiment, the same hash algorithm (using the same hardware 200) that generated the original hash is used to generate a new one-way hash of the same data. In one embodiment, the receiver compares the new hash against the original hash. In one embodiment, if the two match hash match, it is determined that the data has not changed since it was signed. In one embodiment, if there is no match, the data is assumed to have been tampered with since it was signed, or the signature may have been created with a private key that doesn't correspond to the public key presented by the signer. In one embodiment, if the two hashes match, the recipient is certain that the public key used to decrypt the digital signature corresponds to the private key used to create the digital signature.

We claim:

1. An apparatus comprising:
a block cipher circuit to receive an input data message and to generate a hashed output data message by applying Unique Block Iteration (UBI) modes, the block cipher circuit comprising at least two mix and permute logic units which are pipelined by registers; and
a counter circuit coupled to respective first and second logic circuits, the first and second logic circuits to generate respective first and second signals to assist the block cipher to process at least two input data messages simultaneously, the first signal to signify a first round, the second signal to signify end of one of the at least two messages.

2. The apparatus of claim 1 further comprising:
a tweak generator to generate first and second tweaks; and
a key scheduler to receive the first and second tweaks and to generate first and second keys for the block cipher circuit.

3. The apparatus of claim 2, wherein the block cipher circuit further comprises:
a modulo-$2^{64}$ adder to receive the at least one input data messages and corresponding first key, and wherein the modulo-$2^{64}$ adder is to generate an output signal which is input to at least one of the mix and permute logic units.

4. The apparatus of claim 3, wherein the input data is chopped into equal numbers of blocks for processing by the modulo-$2^{64}$ adder.

5. The apparatus of claim 4, wherein the input data message is 512 bits long, and wherein each portion is chopped into 8 blocks, and wherein each block is 64 bit long.

6. The apparatus of claim 4, wherein the input data message is 1024 bits long, and wherein each portion is chopped into 16 blocks, and wherein each block is 64 bits long.

7. The apparatus of claim 4, wherein the input data message is 256 bits long, and wherein each portion is chopped into 4 blocks, and wherein each block is 64 bits long.

8. The apparatus of claim 3, wherein the block cipher circuit comprises 8 rounds of mix and permute logic units, wherein each round of mix and permute logic units comprise 4 parallel mix logic units and a permute logic unit, and wherein the pipelined registers are to receive an output from the fourth round of mix and permute logic units.

9. The apparatus of claim 8, wherein the block cipher circuit is operable to generate the hashed output data after 72 rounds of mix and permute logic operations.

10. The apparatus of claim 8, wherein each of the first and second keys are 512 bits long.

11. The apparatus of claim 1, wherein one of the mix logic units comprises:
a logarithmic adder to add two input signals and to generate a summation signal;
a logic unit operable to left rotate one of the two input signals and to generate a rotated signal; and
an exclusive-OR (XOR) logic unit to apply an XOR logical operation on the rotated signal and the summation signal to generate an output signal.

12. The apparatus of claim 1, further comprising an exclusive-OR (XOR) logic unit to apply an XOR operation on the output of the block cipher circuit and on one of the input data messages sampled by the first clock signal to generate hashed data.

13. The apparatus of claim 12, wherein the key scheduler is to receive the hashed data to generate the first and second keys for the block cipher circuit.

14. A system comprising:
a memory; and
a processor coupled to the memory, the processor comprising:
a block cipher circuit to receive an input data message and to generate a hashed output data message by applying Unique Block Iteration (UBI) modes, the block cipher circuit comprising at least two mix and permute logic units which are pipelined by registers; and
a counter circuit coupled to respective first and second logic circuits, the first and second logic circuits to generate respective first and second signals to assist the block cipher to process at least two input data messages simultaneously, the first signal to signify a first round, the second signal to signify end of one of the at least two messages.

15. The system of claim 14 further comprises:
a tweak generator to generate first and second tweaks; and
a key scheduler to receive the first and second tweaks and to generate first and second keys for the block cipher circuit.

16. The system of claim 14, wherein the block cipher circuit further comprises:
a modulo-$2^{64}$ adder operable to receive the at least one input data message and corresponding first key, and wherein the modulo-$2^{64}$ adder is operable to generate an output signal which is input to at least one of the mix and permute logic units.

17. The system of claim 14, wherein the block cipher circuit comprises 8 rounds of mix and permute logic circuits, wherein each round of mix and permute logic circuits comprise 4 parallel mix logic units and a permute logic unit, and wherein the pipelined registers are to receive an output from the fourth round of mix and permute logic units.

18. The system of claim 14 further comprising an exclusive-OR (XOR) logic unit to apply XOR operation on the output of the block cipher circuit and on one of the input data sampled by the first clock signal to generate hashed data, wherein the key scheduler is to receive the hashed data to generate the first and second keys for the block cipher circuit.

* * * * *